United States Patent
Song

(10) Patent No.: US 6,977,810 B2
(45) Date of Patent: Dec. 20, 2005

(54) HINGE DEVICE AND ELECTRIC AND ELECTRONIC APPARATUSES EMPLOYING THE SAME

(75) Inventor: Young-shin Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 181 days.

(21) Appl. No.: 10/725,628

(22) Filed: Dec. 3, 2003

(65) Prior Publication Data

US 2004/0125552 A1 Jul. 1, 2004

(30) Foreign Application Priority Data

Dec. 30, 2002 (KR) ............... 10-2002-0086904

(51) Int. Cl.[7] ................................................ G06F 1/16
(52) U.S. Cl. ................................ 361/683; 16/342
(58) Field of Search ................ 361/683; 16/342, 16/374, 338

(56) References Cited

U.S. PATENT DOCUMENTS

| | | | | |
|---|---|---|---|---|
| 5,507,072 A | * | 4/1996 | Youn | 16/261 |
| 5,724,704 A | * | 3/1998 | Seo | 16/254 |
| 5,796,576 A | * | 8/1998 | Kim | 361/681 |
| 5,896,622 A | * | 4/1999 | Lu | 16/342 |
| 6,170,120 B1 | * | 1/2001 | Lu | 16/342 |
| 6,230,365 B1 | * | 5/2001 | Lu | 16/342 |
| 6,317,315 B1 | * | 11/2001 | Lee et al. | 361/681 |
| 2002/0042971 A1 | * | 4/2002 | Liao | 16/342 |
| 2004/0134032 A1 | * | 7/2004 | Lu et al. | 16/342 |

FOREIGN PATENT DOCUMENTS

| | | |
|---|---|---|
| JP | 2001-74028 | 3/2001 |
| JP | 2002-147434 | 5/2002 |
| JP | 2002-185158 | 6/2002 |
| KR | 20-114809 | 12/1997 |
| KR | 10-178893 | 11/1998 |
| KR | 2000-642 | 1/2000 |
| KR | 10-296036 | 5/2001 |
| KR | 20-0250082 | 9/2001 |

* cited by examiner

Primary Examiner—Lisa Lea-Edmonds
(74) Attorney, Agent, or Firm—Staas & Halsey LLP

(57) ABSTRACT

A hinge device opening and closing a display unit of an electrical or electronic apparatus, including a display coupler having a display bracket coupled to one side of the display unit, and a rotational shaft extending from the display bracket; a slider supporting the rotational shaft; a body coupler having a body bracket coupled to the main body, and a guide rail extending from the body bracket and supporting the slider between a locked position and an unlocked position; and a rotation controller having a stopper formed on the rotational shaft and a boss formed on the guide rail, the stopper allowing rotation of the rotational shaft relative to the slider when the slider is in the unlocked position, and the stopper engaging the boss and restraining the rotation of the rotational shaft when the slider is in the locked position to maintain the display unit at a desired angle.

19 Claims, 12 Drawing Sheets

HINGE DEVICE AND ELECTRIC AND ELECTRONIC APPARATUSES EMPLOYING THE SAME

CROSS-REFERENCE TO RELATED APPLICATIONS

This application claims the benefit of Korean Patent Application No. 2002-86904, filed Dec. 30, 2002, in the Korean Intellectual Property Office, the disclosure of which is incorporated herein by reference.

BACKGROUND OF THE INVENTION

1. Field of the Invention

The present invention relates, in general, to a hinge device and electric and electronic apparatuses employing the hinge device, and, more particularly, to a hinge device used in opening and closing a display unit relative to a main body of folding-type electric and electronic apparatuses.

2. Description of the Related Art

The hinge device according to the present invention can be applied to a variety of folding-type electric and electronic apparatuses such as portable computers (e.g., notebook computers), cellular phones, and PDAs (personal digital assistants), etc.

Herein, the term "folding-type" refers to electric and electronic apparatuses having a display unit as one component and a main body as another component, and the display unit opens and closes relative to the main body.

A conventional device for opening and closing a display unit relative to a main body of a notebook computer is described with reference to FIG. 1.

FIG. 1 is an exploded perspective view a conventional notebook computer. As shown in FIG. 1, a main body 1 and a display unit 2 are joined using a hinge device 3. The display unit 2 is rotatably coupled to the main body 1 via the hinge device 3.

The display unit 2 has a latch 4 on one side thereof. The latch 4 includes a clasp 5 used to open and close the display unit 2 and a latch slide 6 controlling motion of the clasp 5. The main body 1 is formed with a hole 7 through which the clasp 5 of the latch 4 is inserted.

Processes of opening and closing the display unit 2 of the conventional notebook computer are described below.

When the display unit 2 is closed relative to the main body 1, the clasp 5 of the latch 4 on the display unit 2 is inserted into the hole 7 of the main body 1. A spring (not shown) pushes against the latch slide 6, thereby holding the clasp 5 in place within the hole 7 to keep the display unit 2 closed.

To open the display unit 2 relative to the main body 1, the latch slide 6 of the latch 4 is pushed horizontally, releasing the clasp 5 that has been inserted into the hole 7. Thereafter, the display unit 2 is opened by rotating the display unit 2 relative to the main body 1.

FIG. 2 is a perspective view of the conventional hinge device 3. As illustrated therein, the hinge device 3 includes a display coupler 11 and a body coupler 21.

The display coupler 11 includes a display bracket 12 and a rotational shaft 13. The body coupler 21 includes a body bracket 22, an engaging hole 23, an engaging projection 24, a coupler body 25, and an inserting hole 26. The rotational shaft 13 of the display coupler 11 is rotatably inserted into the inserting hole 26 of the body coupler 21. The body bracket 22 of the body coupler 21 is integrally combined with the coupler body 25.

However, the conventional assembly for opening and closing the display unit 2 has the following problems.

First, the latch 4 needs to be mounted on the display unit 2, the hole 7 is formed on the main body 1, and the hinge device 3 is required to connect the display unit 2 to the main body 1. The latch 4 has several components including the clasp 5, the latch slide 6, and the spring, and the hinge device 3 also includes several components. Thus, the assembling process is complicated, reducing productivity and increasing cost.

Second, the clasp 5 projecting from the display unit 2 is likely to be damaged, and an external appearance of the display unit 2 may not be graceful due to the clasp 5, the hole 7, etc.

Third, when the display unit 2 receives external impacts, the display unit 2 may become damaged and no longer open as desired or remain at a desired angle when tilted back and away from the main body 1, making use of the notebook computer inconvenient.

SUMMARY OF THE INVENTION

It is an aspect of the present invention to provide a hinge device without a latch to easily open and close the display unit of an electric or electronic apparatus and to maintain the display unit at a desired angle when tilted back, and electric and electronic apparatuses employing the same.

Additional aspects and/or advantages of the invention will be set forth in part in the description that follows and, in part, will be obvious from the description, or may be learned by practice of the invention.

To achieve the above and/or other aspects according to the present invention, there is provided a hinge device that rotatably opens and closes a display unit relative to a main body of an electronic apparatus, including a display coupler having a display bracket coupled to one side of the display unit, and a rotational shaft extending from the display bracket; a slider rotatably supporting the rotational shaft of the display coupler; a body coupler having a body bracket coupled to the main body, and a guide rail extending from the body bracket and slidably supporting the slider between a locked position and an unlocked position; and a rotation controller having a stopper formed on the rotational shaft and a hanging boss formed on one side of the guide rail, the stopper allowing a rotation of the rotational shaft relative to the slider when the slider is in the unlocked position to open or close the display unit, and the stopper engaging the hanging boss and restraining the rotation of the rotational shaft when the slider is in the locked position to maintain the display unit at a desired angle relative to the main body.

The slider includes a slider body; an inserting hole formed on the slider body, through which the rotational shaft of the display coupler is inserted and rotated; and an engaging part formed on the bottom of the slider body, the guide rail slidably receiving the engaging part.

The hinge device further includes an elastic unit inserted into the body coupler, elastically supporting the slider.

The elastic unit includes a body part inserted into the body coupler; an engaging hole formed on the body part to couple the elastic unit to the slider; and an elastic part extending from a side of the body part to elastically support the slider.

The slider has an engaging hole formed on a bottom face of the slider body, through which the elastic unit is coupled to the slider body of the slider, and the guide rail of the body coupler has a guide hole formed on a bottom face thereof, through which the slider and the elastic unit are coupled to each other and slid together, and an inserting part through which the elastic unit is seated.

To achieve the above and/or other aspects according to the present invention, there is provided an electronic apparatus including a main body; a display unit; a hinged device to rotatably connect the display unit to the main body and open and close the display unit, the hinge device comprising a display coupler having a display bracket coupled to one side of the display unit, and a rotational shaft extending from the display bracket, a slider rotatably supporting the rotational shaft of the display coupler, a body coupler having a body bracket coupled to the main body, and a guide rail extending from the body bracket and slidably supporting the slider between a locked position and an unlocked position, and a rotation controller having a stopper formed on the rotational shaft and a hanging boss formed on one side of the guide rail, the stopper allowing a rotation of the rotational shaft relative to the slider when the slider is in the unlocked position to open or close the display unit, and the stopper engaging the hanging boss and restraining the rotation of the rotational shaft when the slider is in the locked position to maintain the display unit at a desired angle relative to the main body.

To achieve the above and/or other aspects according to the present invention, there is provided a method of opening a display unit that is closed relative to a main body of an electronic apparatus having a hinge device that rotatably joins the display unit to the main body, including sliding the display unit horizontally relative to the main body, from a first position to a second position to offset the display unit from the main body, placing the hinge device in an unlocked position; rotating the display unit away from the main body to a desired angle relative to the main body to open the display unit; and sliding the display unit horizontally relative to the main body to return the display unit to the first position, placing the hinge device in a locked position, to maintain the display unit at the desired angle.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the present invention will become apparent and more readily appreciated from the following description of the embodiments, taken in conjunction with the accompany drawings, of which.

DETAILED DESCRIPTION OF THE PREFERRED EMBODIMENT

Figure 1:
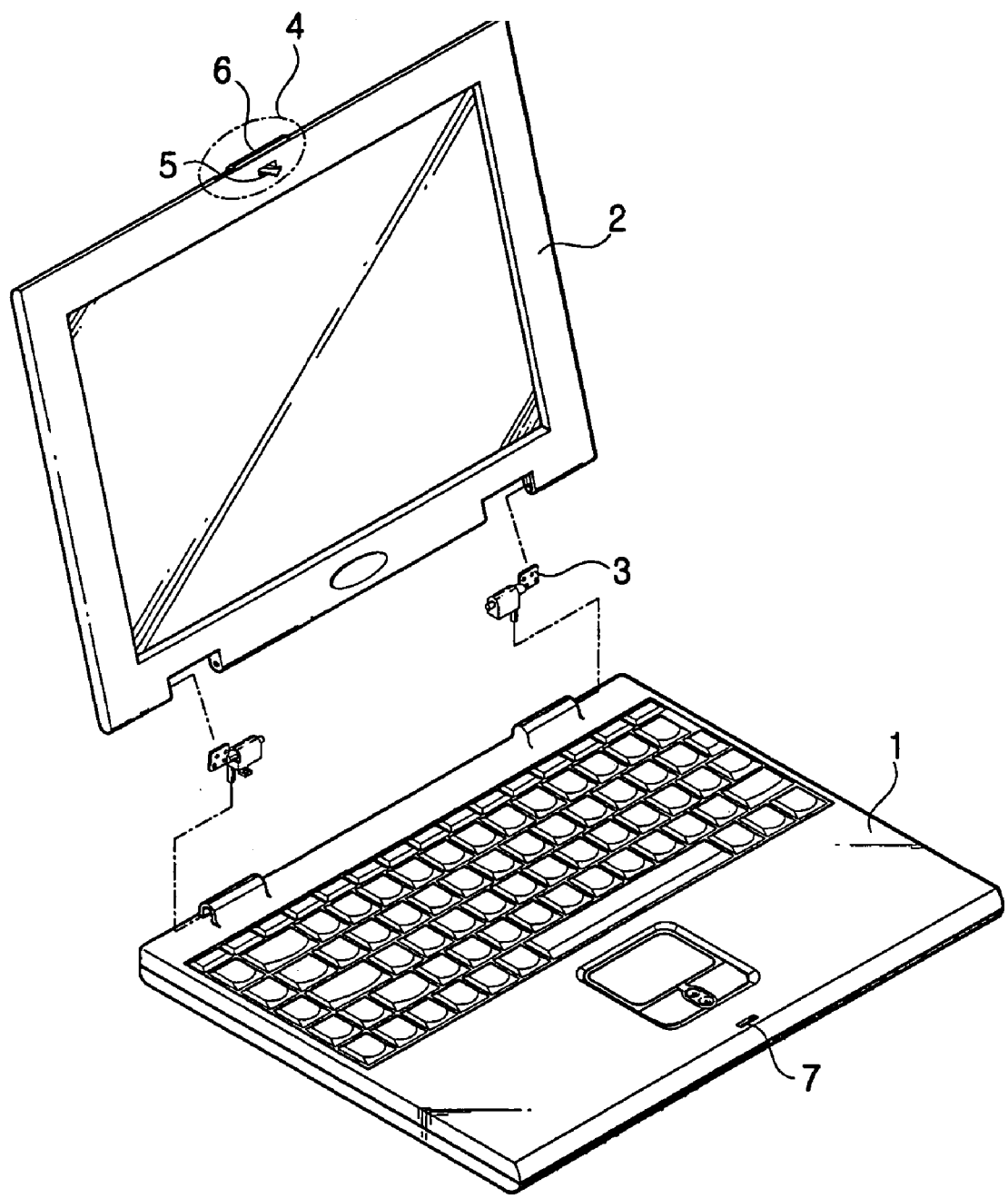
FIG. 1 is an exploded perspective view of a conventional notebook computer, including an assembly for opening and closing the conventional notebook computer.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Figure 3:
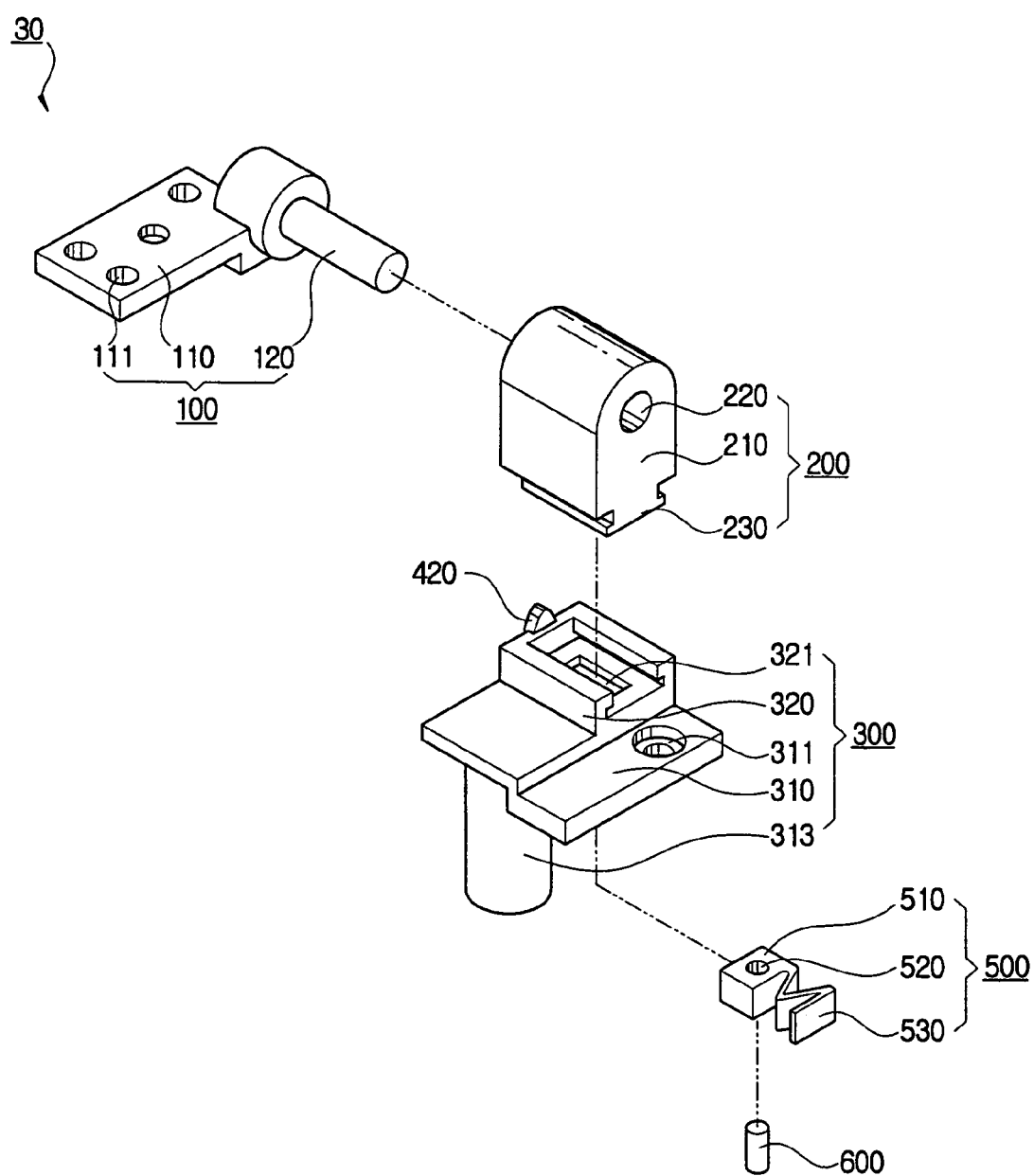
FIG. 3 is an exploded top-level view of a hinge device according to an embodiment of the present invention.
Figure 4:
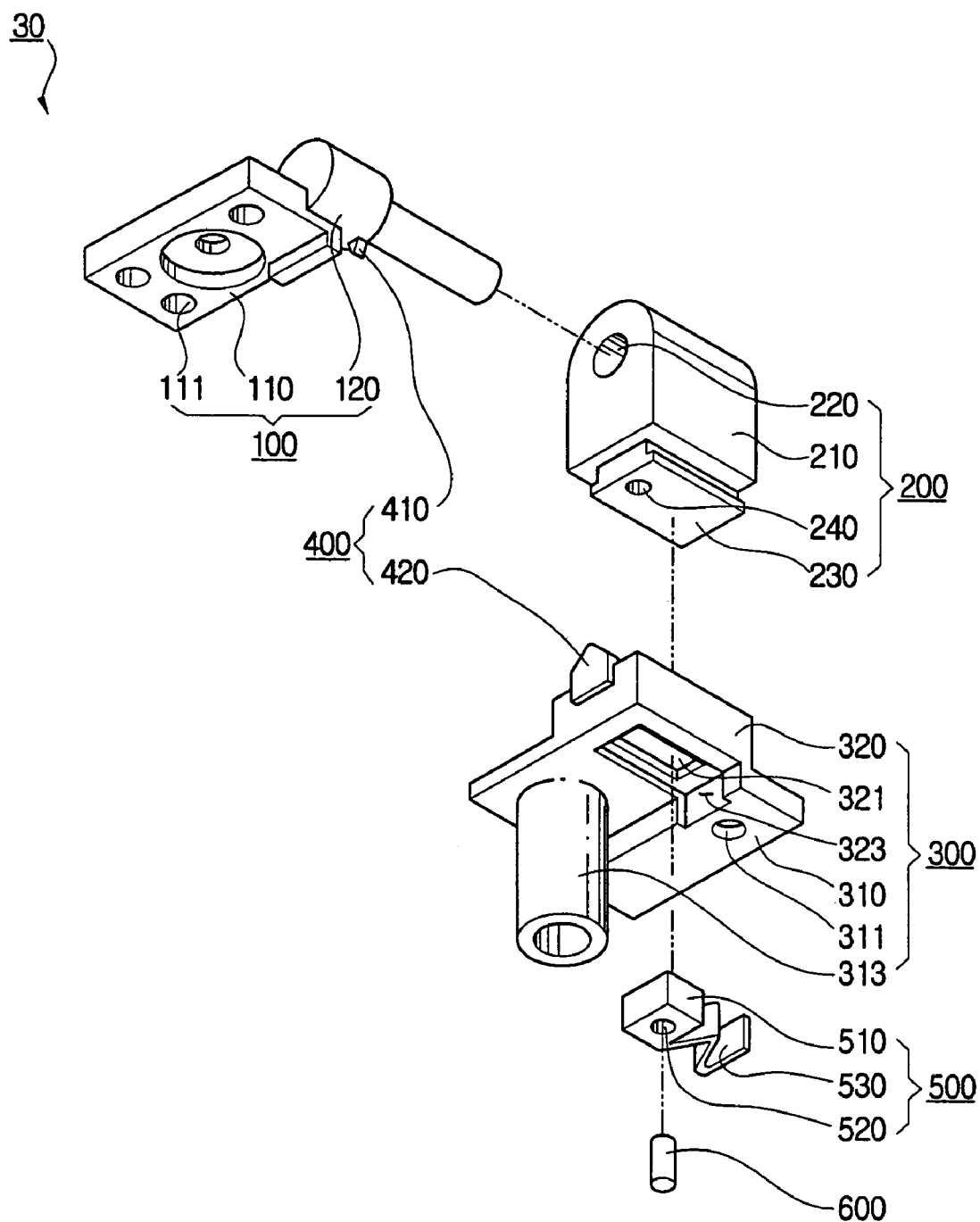
FIG. 4 an exploded bottom-level view of the hinge device of FIG. 3.
Figure 5:
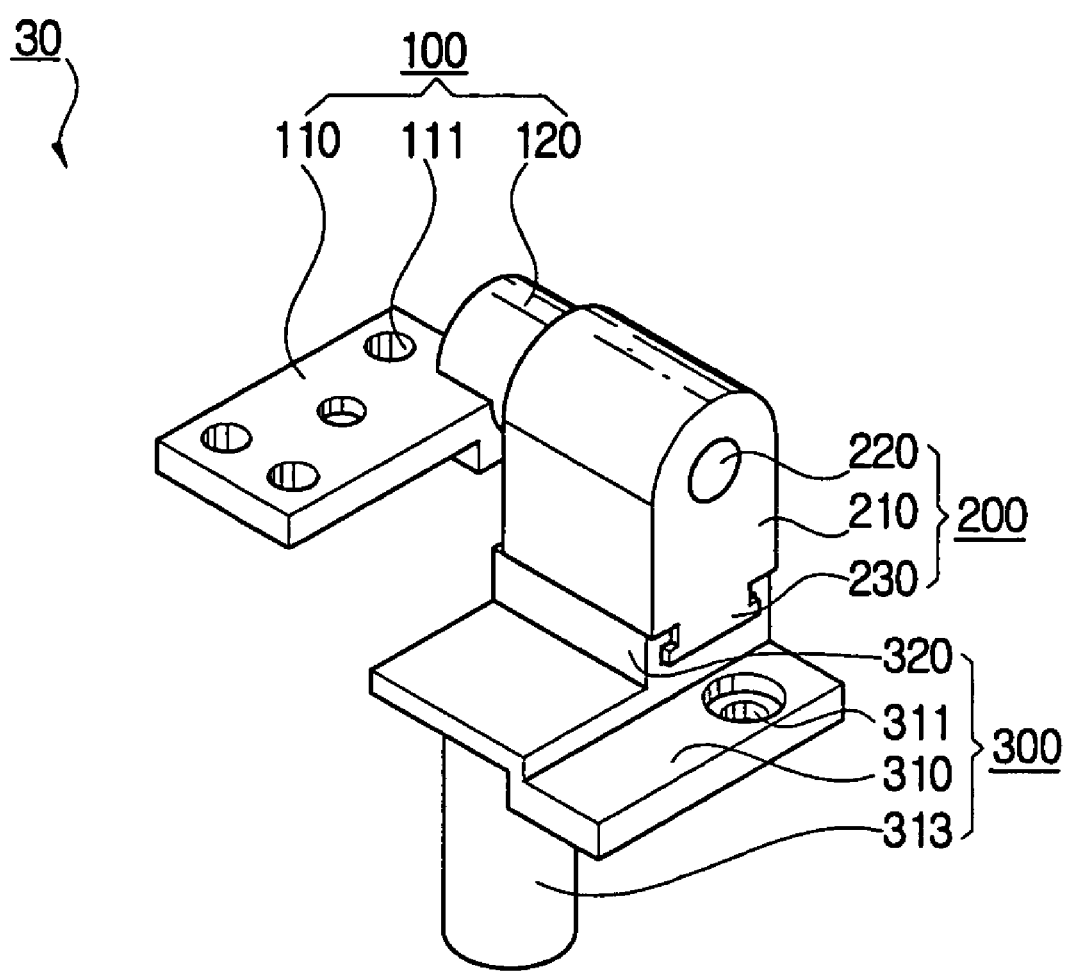
FIG. 5 is a perspective view showing the hinge device of FIGS. 3 and 4 as assembled.

FIG. 3 is an exploded view of a hinge device 30 according to the present invention as viewed from the top of the hinged device 30. FIG. 4 an exploded view of the hinge device 30 according to the present invention as viewed from the bottom of the hinge device 30. FIG. 5 is a perspective view showing the hinge device 30 of the present invention as assembled.

Referring to FIGS. 3 and 4, the hinge device 30 includes a display coupler 100, a slider 200, a body coupler 300, and a rotation controller 400.

The display coupler 100 includes a display bracket 110 and a rotational shaft 120.

Figure 7:
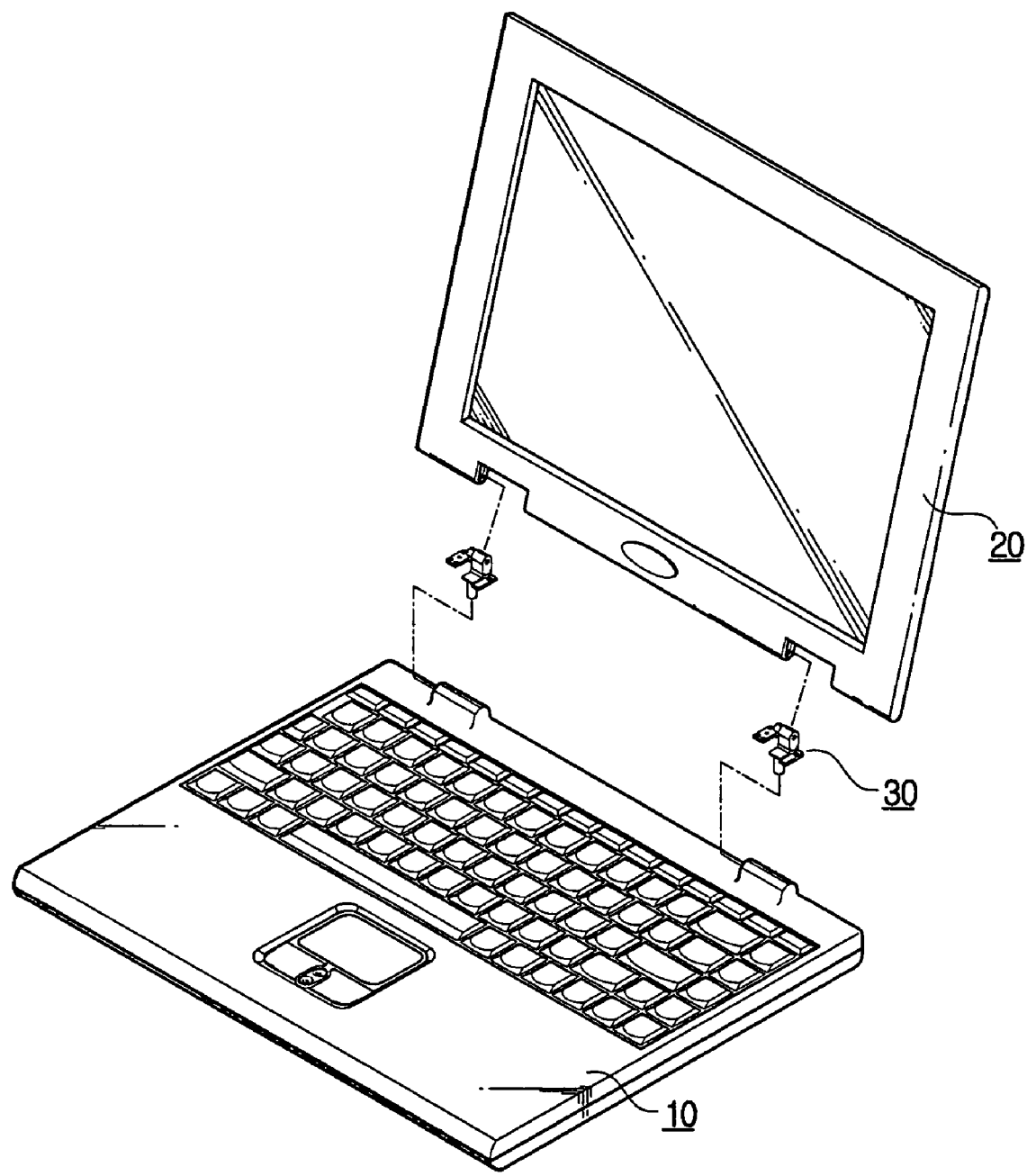
FIG. 7 is a perspective view of the hinge device according to the present invention relative to a notebook computer.

The display bracket 110 is shaped, for example as a plate. Also, the display bracket 110 has multiple engaging holes 111, for example, through which the display bracket 110 is coupled to the display unit 20 (FIG. 7).

The rotational shaft 120 extends from one side of the display bracket 110. The rotational shaft 120 has a circular rod shape, for example, as illustrated in FIGS. 3 and 4.

The slider 200 includes a slider body 210, an inserting hole 220, and an engaging part 230. The slider 200 supports the rotational shaft 120 of the display coupler 100 in a rotatable manner. The inserting hole 220 is formed in the upper part of the slider body 210. The rotational shaft 120 of the display coupler 100 is inserted through the inserting hole 220 and rotates within the inserting hole 220.

Figure 2:
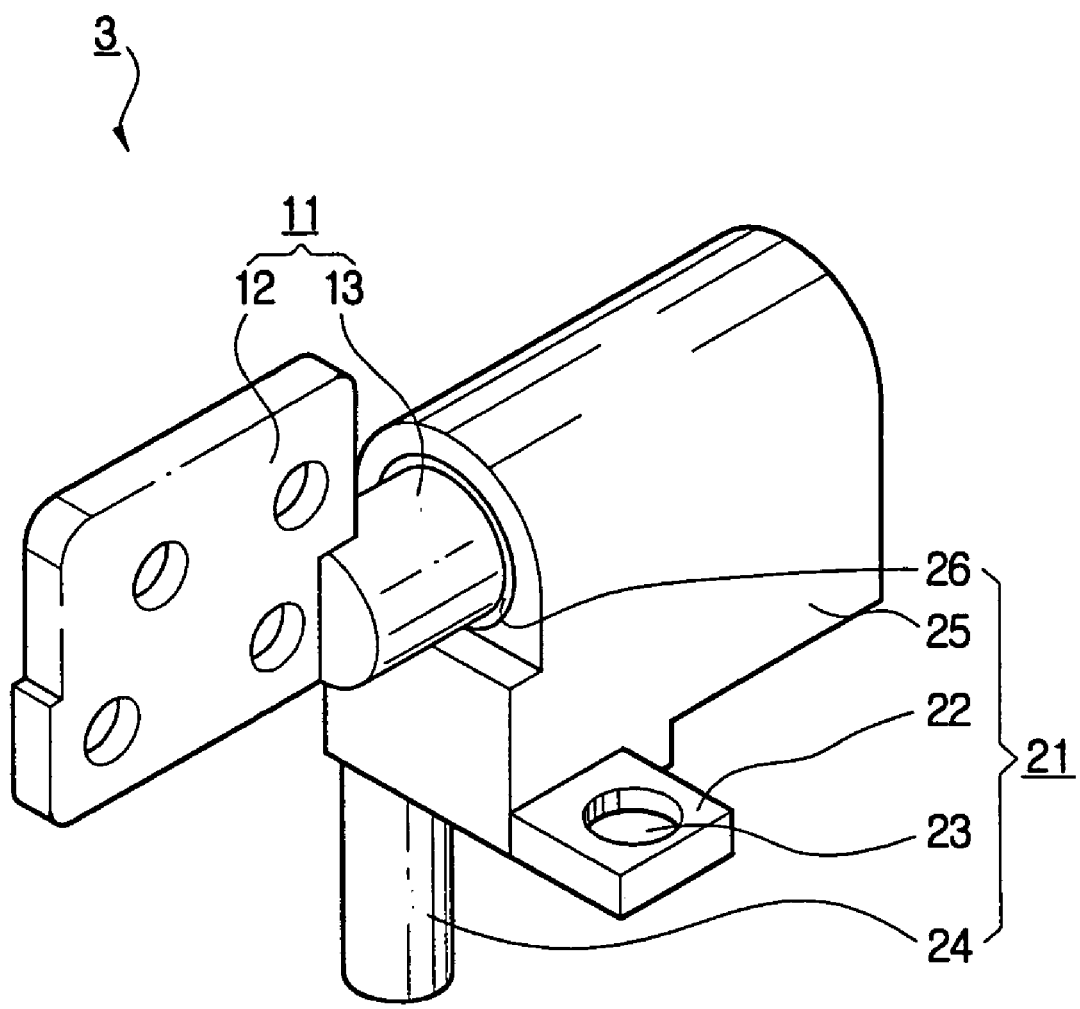
FIG. 2 is a perspective view of a conventional hinge device.

The slider body 210 corresponds in shape to the conventional hinge device 3 as illustrated in FIG. 2. Thus, the hinge device 30 of the present invention can advantageously be applied in the same position at which the conventional hinge device 3 is mounted.

The engaging part 230 is formed on the bottom of the slider body 210. The engaging part 230 is inserted into a guide rail 320 of the body coupler 300 in a slidable manner. The engaging part 230 supports the slider 200 in a slidable manner relative to the body coupler 300.

The body coupler 300 includes a body bracket 310 and the guide rail 320. The guide rail 320 is formed on one side of the body bracket 310 and supports the engaging part 230 of the slider 200 in a slidable manner. The body bracket 310 has an engaging hole 311 and an engaging projection 313. The body bracket 310 is employed in coupling the main body 10 (FIG. 7) of electric and electronic apparatuses with the hinge device 30 of the present invention. Generally, the body bracket 310 is shaped as a plate, but it may also be shaped as stairs as shown in FIG. 3.

If the body bracket 310 includes the engaging projection 313, then one engaging hole 311 is sufficient for attachment to the main body 10. Otherwise, multiple engaging holes 311 are used.

Figure 6A:
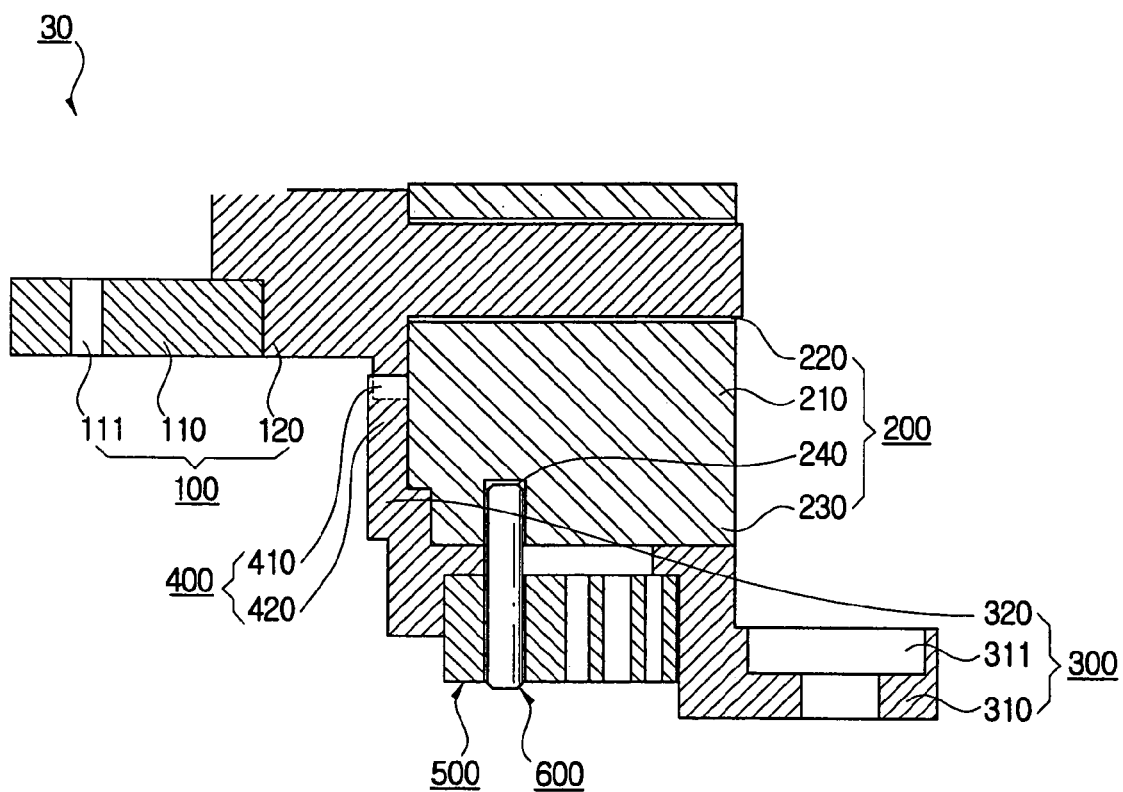
FIG. 6A is a front sectional view of the hinge device of the present invention in a locked position.
Figure 6B:
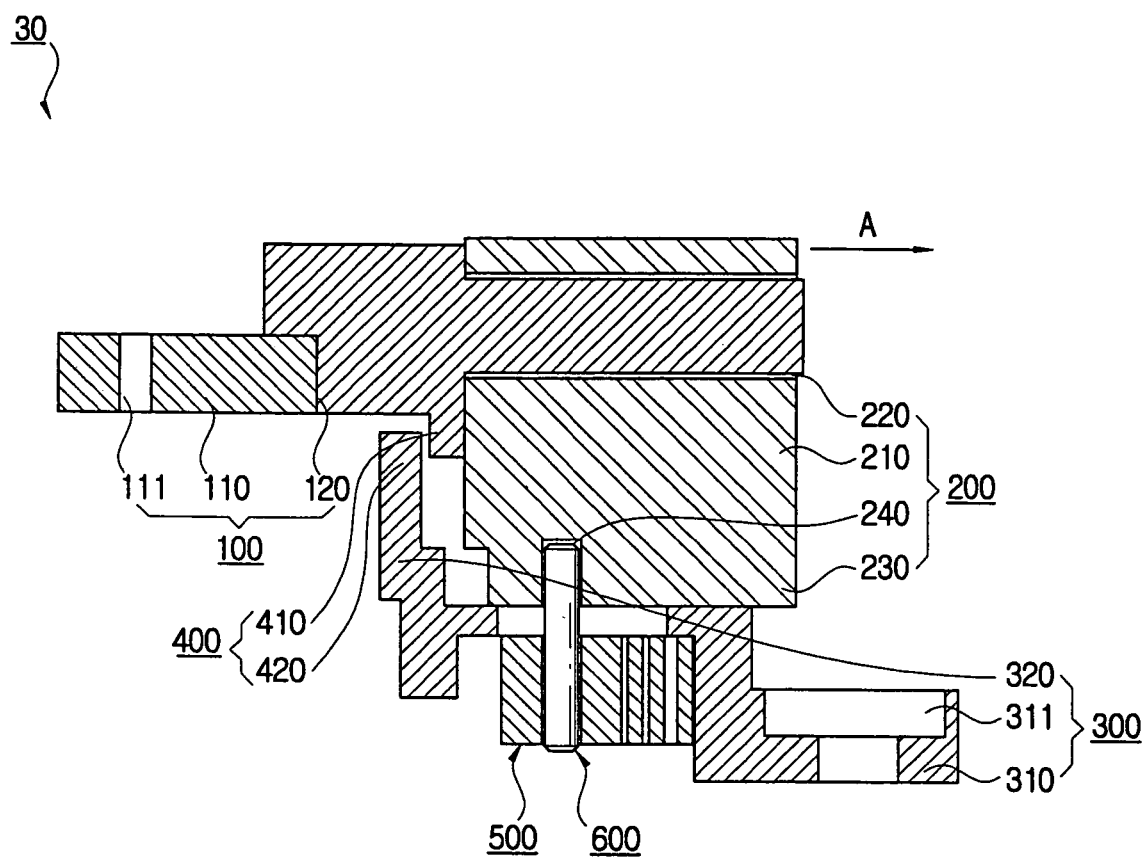
FIG. 6B is a front sectional view of the hinge device of the present invention in an unlocked position.

FIG. 6A is a front sectional view of the hinge device 30 of the present invention in a locked position before the latch slide 6 is slid. FIG. 6B is a front sectional view of the hinge device 30 of the present invention after the latch slide 6 has been slid.

The rotation controller 400 is described, with reference to FIGS. 6A and 6B. The rotation controller 400 has a stopper 410 and a hanging boss 420. The stopper 410 is formed on one side of the rotational shaft 120 of the display coupler 100. The hanging boss 420 is formed on one side of the guide rail 320 of the body coupler 300.

As shown in FIG. 6A, when the slider 200 is in a locked position, the stopper 410 engages the hanging boss 420, restraining rotation of the rotational shaft 120 relative to the slider 200. As shown in FIG. 6B, when the slider 200 is in an unlocked position, the stopper 410 does not engage the hanging boss 420, enabling rotation of the rotational shaft 120 relative to the slider 200.

In other words, when the slider 200 is unlocked, the display unit 20 slides horizontally relative to the main body 10 of electric and electronic apparatuses and, in response, the stopper 410 moves to a position at which the stopper 410 does not engage the hanging boss 420. Thus, the display coupler 100 and the stopper 410 can be rotated. Accordingly, the display unit 20 of electric and electronic apparatuses coupled to the display coupler 100 of the hinge device 30 can be rotated.

Referring to FIGS. 3 and 4, the hinge device 30 according to the present invention includes an elastic unit 500. The elastic unit 500 is inserted onto the bottom face of the body coupler 300, elastically supporting the slider 200. The elastic unit 500 includes a body part 510, an engaging hole 520, and an elastic part 530. The body part 510 is inserted onto the bottom face of the body coupler 300. The bottom face of the body coupler 300 has a portion corresponding in shape to the body part 510, as shown in FIG. 4. The engaging hole 520 is formed on the body part 510 and is used to couple the body part 510 to the slider 200. The elastic part 530 extends from one side of the body part 510 in a continuous wave-like form.

The slider 200 includes an engaging hole 240 (FIG. 4). The engaging hole 240 is formed on the bottom face of the slider body 210 to couple the slider body 210 of the slider 200 with the elastic unit 500.

The guide rail 320 of the body coupler 300 includes a guide hole 321 and an inserting part 323 (FIG. 4) into which the elastic unit 500 is inserted. The guide hole 321 is formed on the bottom face of the guide rail 320 to allow the slider 200 and the elastic unit 500 to be combined and slid together. The guide hole 321 is formed elongated so that the slider 200 and the elastic unit 500 may be integrally combined and slidable together. On the topside of the guide hole 321 is disposed the slider 200 and on the underside thereof is disposed the elastic unit 500.

The slider 200 and the elastic unit 500 are coupled to each other by fasteners 600 such as screws, etc., through the engaging hole 240 of the slider 200 and the engaging hole 520 of the elastic unit 500.

As shown in FIG. 4, the inserting part 323 is formed on the bottom face of the guide rail 320 so that the elastic unit 500 can be seated.

FIG. 7 is a perspective view showing the hinge device 30 of the present invention relative to a notebook computer as one embodiment of the present invention.

The notebook computer of FIG. 7 includes the main body 10, the display unit 20, and the hinge device 30. The notebook computer includes the hinge device 30 according to the present invention, the display unit 20 to which the display coupler 100 of the hinge device 30 is coupled, and the main body 10 to which the body coupler 300 of the hinge device 30 is coupled. As shown in FIG. 7, the notebook computer has neither a hole on the main body 10 nor a latch on the display unit 20, in contrast to the conventional notebook computer as shown in FIG. 1.

The process of opening the display unit 20 relative to the main body 10 of the notebook computer is described below.

FIGS. 8A through 8D are views showing the operations in opening the display unit 20 of the notebook computer.

Figure 8A:
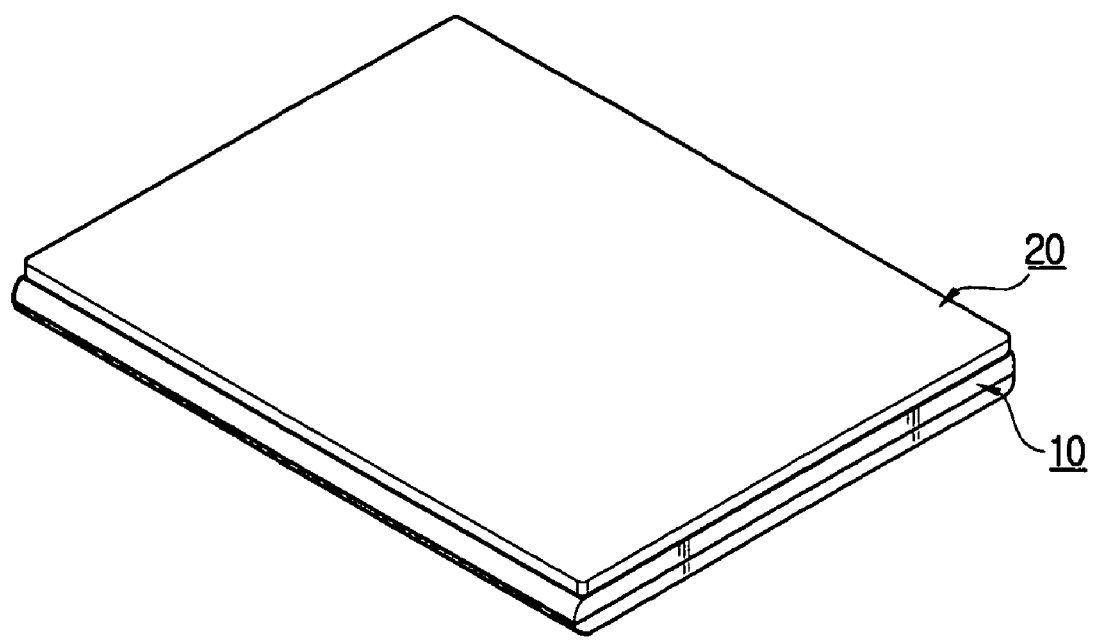
FIGS. 8A through 8D are views showing the operation-by-operation process of opening a display unit of the notebook computer.

First, the display unit 20 of the notebook computer is closed relative to the main body 10 as shown in FIG. 8A, with the hinge device 30 being in a locked position, as shown in FIG. 6A.

Figure 8B:
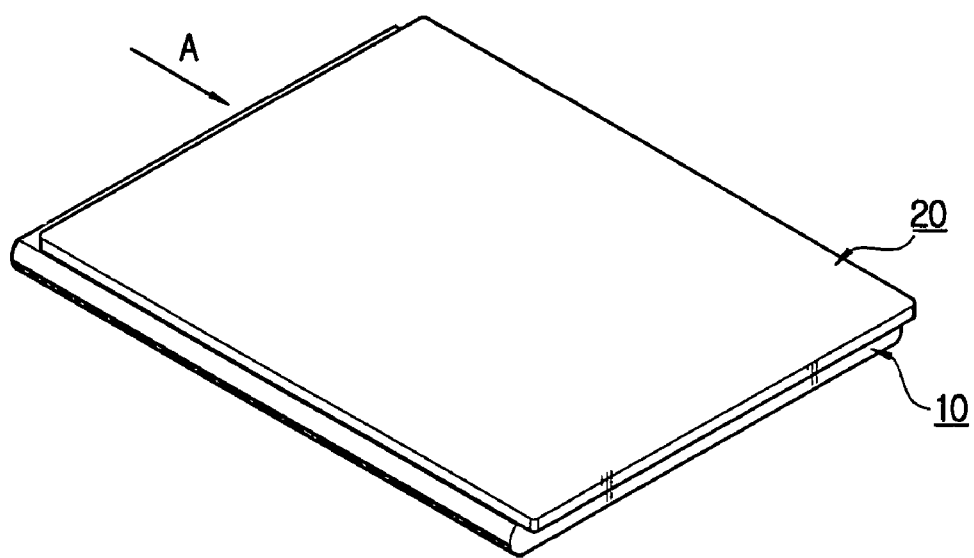

Second, the display unit 20 of the notebook computer is slid in the "A" direction relative to the main body 10 as shown in FIG. 8B, which places the hinge device 30 in an unlocked position, as shown in FIG. 6B. The display unit 20 may be slid to the right, as shown in FIG. 8B, as well as to the left.

Figure 8C:
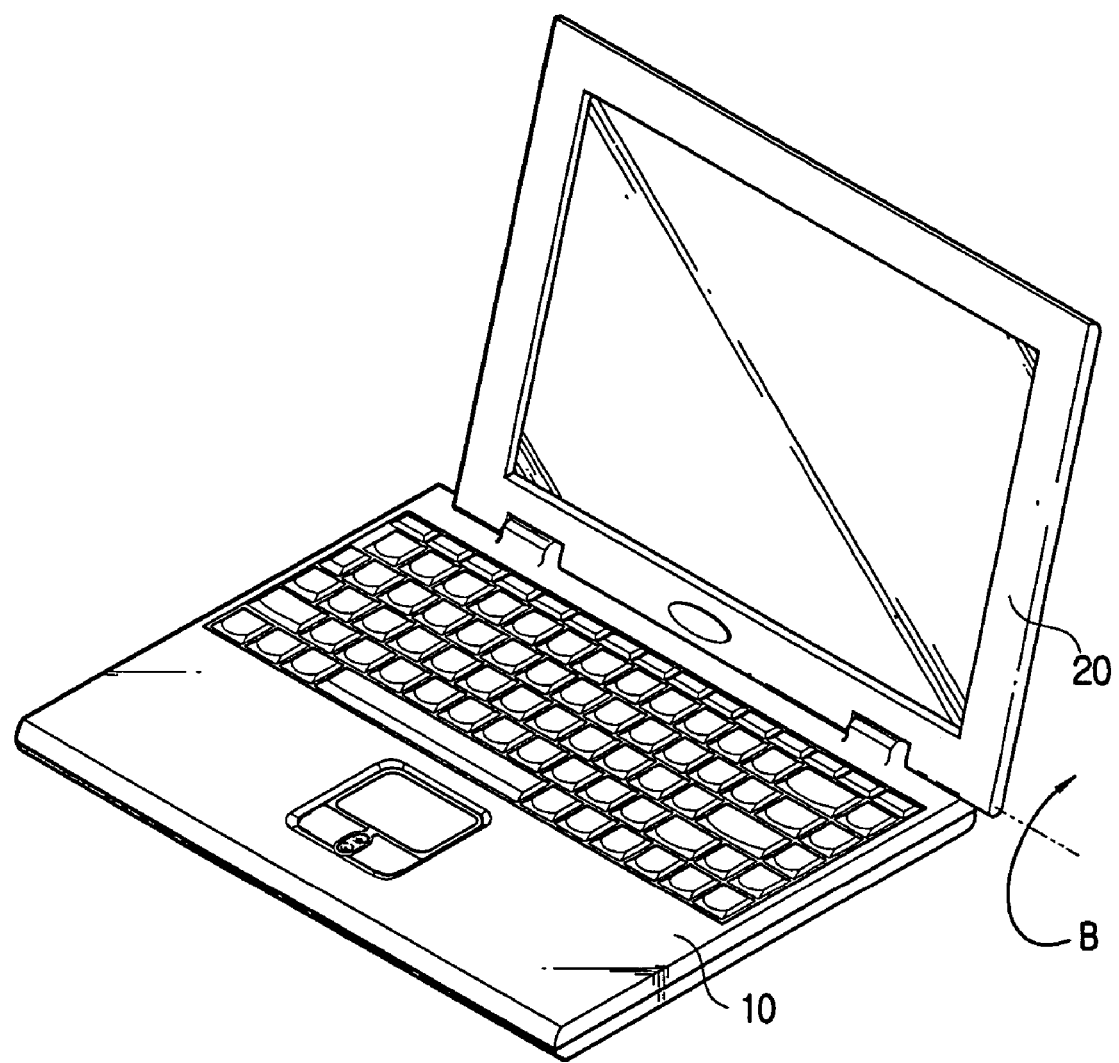

Third, the display unit 20 of the notebook computer is rotated in the "B" direction relative to the main body 10 and subsequently opened as shown in FIG. 8C, with the hinge device 30 remaining in the unlocked position, as shown in FIG. 6B.

Figure 8D:
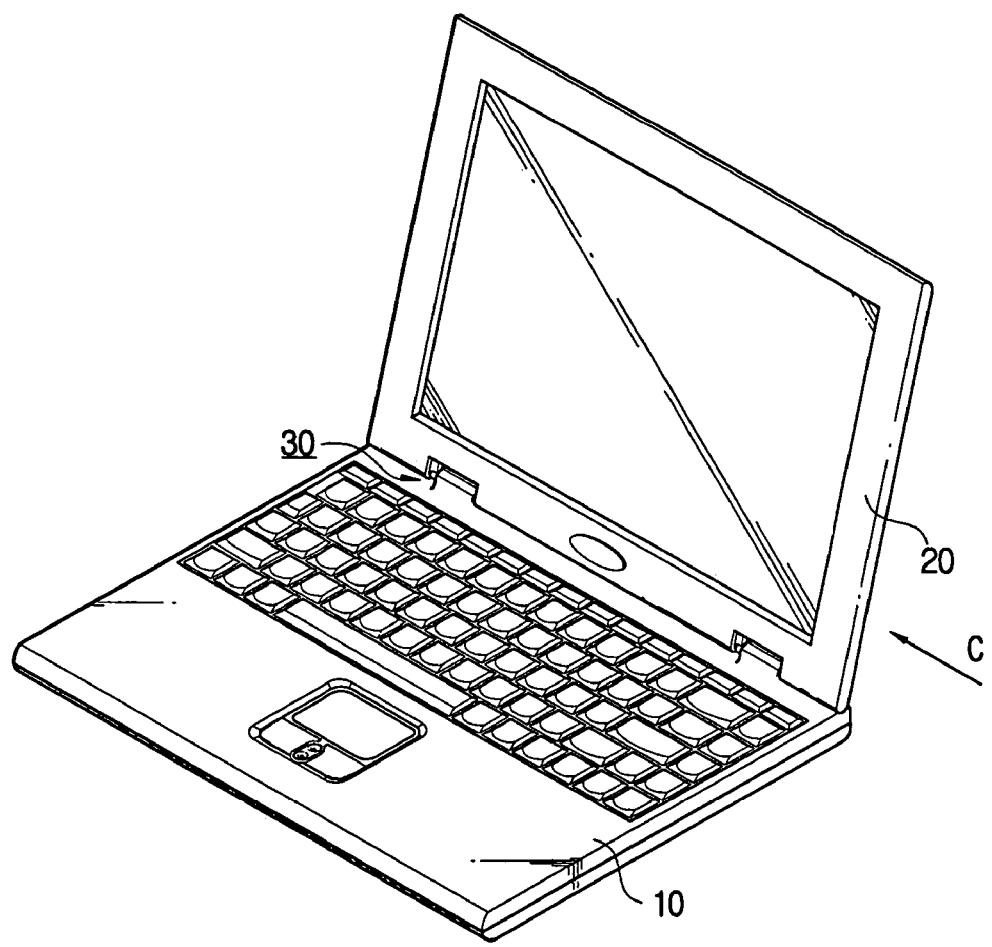

Fourth, the display unit 20 of the notebook computer is slidingly moved in the "C" direction relative to the main body 10 as shown in FIG. 8D, which places the hinge device 30 in the locked position, as shown in FIG. 6A. The elastic unit 500 allows the hinge device 30 to more easily slide in the "C" direction due to the elasticity of the elastic unit 500.

As described above, the display unit 20 of the notebook computer may be opened relative to the main body 10 easily using the hinge device 30 according to the present invention, following the operation-by-operation procedures as described above, without the necessity of a latch on the display unit 20 or a hole on the main body 10.

To close the display unit 20 relative to the main body 10, the steps described above are reversed.

The display unit 20 remains open at a desired angle. If the user desires to change the tilt of the opened display unit 20, the operations as shown in FIGS. 8B to 8D should be repeated. The tilt of the opened display unit 20 can be maintained against external impacts after the display unit 20 is opened to the angle desired by the user.

As described above, the hinge device 30 according to the present invention has the following advantages.

First, the hinge device 30 does not require a latch. Opening and closing the display unit 20 can be achieved just with the hinge device 30.

Second, the tilt of the display unit 20 after being opened to a desired angle may be maintained regardless of external impacts, allowing the user to use the electric and electronic apparatuses in a secure manner.

Although an embodiment of the present invention has been shown and described, it will be appreciated by those skilled in the art that changes may be made in this embodiment without departing from the principles and spirit of the invention, the scope of which is defined in the appended claims and their equivalents.

What is claimed is:

1. A hinge device that rotatably opens and closes a display unit relative to a main body of an electrical or electronic apparatus, the hinge device comprising:
   a display coupler having a display bracket coupled to one side of the display unit, and a rotational shaft extending from the display bracket;
   a slider rotatably supporting the rotational shaft of the display coupler;
   a body coupler having a body bracket coupled to the main body, and a guide rail extending from the body bracket and slidably supporting the slider between a locked position and an unlocked position; and
   a rotation controller having a stopper formed on the rotational shaft and a hanging boss formed on one side of the guide rail, the stopper allowing a rotation of the rotational shaft relative to the slider when the slider is in the unlocked position and restraining the rotation of the rotational shaft when the slider is in the locked position.

2. The hinge device according to claim 1, wherein when the slider is in the unlocked position, the stopper allows rotation of the rotational shaft to open or close the display unit, and when the slider is in the locked position, the stopper engages the hanging boss to maintain the display unit at a desired angle relative to the main body.

3. The hinge device according to claim 1, wherein the body bracket comprises an engaging projection to couple the hinge device to the main body of the electrical or electronic apparatus.

4. The hinge device according to claim 1, wherein the slider comprises:
   a slider body;
   an inserting hole formed on the slider body, through which the rotational shaft of the display coupler is inserted and rotated; and
   an engaging part formed on the bottom of the slider body, the guide rail slidably supporting the engaging part.

5. The hinge device according to claim 1, further comprising an elastic unit inserted into the body coupler, elastically supporting the slider.

6. The hinge device according to claim 5, wherein the elastic unit is inserted into a bottom face of the body coupler.

7. The hinge device according to claim 5, wherein the elastic unit comprises:
   a body part inserted into the body coupler;
   an engaging hole formed on the body part to couple the elastic unit to the slider; and
   an elastic part extending from a side of the body part to elastically support the slider.

8. The hinge device according to claim 7, wherein a shape of the elastic part extending from the body part is a continues wave shape.

9. The hinge device according to claim 7, wherein the slider has an engaging hole formed on a bottom face of the slider body, through which the elastic unit is coupled to the slider body of the slider, and
   the guide rail of the body coupler has a guide hole formed on a bottom face thereof, through which the slider and the elastic unit are coupled to each other and slid together, and an inserting part through which the elastic unit is seated.

10. An electrical or electronic apparatus, comprising:
    a main body;
    a display unit;
    a hinge device to rotatably connect the display unit to the main body and open and close the display unit, the hinge device comprising
       a display coupler having a display bracket coupled to one side of the display unit, and a rotational shaft extending from the display bracket,
       a slider rotatably supporting the rotational shaft of the display coupler,
       a body coupler having a body bracket coupled to the main body, and a guide rail extending from the body bracket and slidably supporting the slider between a locked position and an unlocked position, and
       a rotation controller having a stopper formed on the rotational shaft and a hanging boss formed on one side of the guide rail, the stopper allowing a rotation of the rotational shaft relative to the slider when the slider is in the unlocked position to open or close the display unit, and the stopper engaging the hanging boss and restraining the rotation of the rotational shaft when the slider is in the locked position to maintain the display unit at a desired angle relative to the main body.

11. The electrical or electronic apparatus according to claim 10, wherein the slider comprises:
    a slider body;
    an inserting hole formed on the slider body, through which the rotational shaft of the display coupler is inserted and rotated; and
    an engaging part formed on the bottom of the slider body, the guide rail slidably supporting the engaging part.

12. The electrical or electronic apparatus according to claim 10, further comprising an elastic unit inserted into the body coupler, elastically supporting the slider.

13. The electrical or electronic apparatus according to claim 12, wherein the elastic unit comprises:
    a body part inserted into the body coupler;
    an engaging hole formed on the body part to couple the elastic unit to the slider, and
    an elastic part extending from a side of the body part to elastically support the slider.

14. The electrical or electronic apparatus according to claim 13, wherein the slider has an engaging hole formed on a bottom face of the slider body, through which the elastic unit is coupled to the slider body of the slider, and
    the guide rail of the body coupler has a guide hole formed on a bottom face thereof, through which the slider and the elastic unit are coupled to each other and slid together, and an inserting part through which the elastic unit is seated.

15. A method of opening a display unit that is closed relative to a main body of an electrical or electronic apparatus having a hinge device that rotatably joins the display unit to the main body, the method comprising:
    sliding the display unit horizontally relative to the main body to offset a back edge of the display unit from the main body, which places the hinge device in an unlocked position;
    opening the display unit by rotating the display unit away from the main body to a desired angle relative to the main body; and
    sliding the display unit horizontally relative to the main body to realign the back edge of the display unit with the main body, which places the hinge device in a locked position and maintains the display unit at the desired angle.

16. The method according to claim 15, wherein the opened display unit is closed by:

sliding the display unit horizontally relative to the main body to offset the back edge of the display unit from the main body, which places the hinge device in the unlocked position;

rotating the display unit toward the main body; and closing the display unit by sliding the display unit horizontally relative to the main body to realign the back edge of the display unit with the main body, which places the hinge device in the locked position.

17. The method according to claim 15, wherein the angle is changed by:

sliding the display unit horizontally relative to the main body to offset the back edge of the display unit from the main body, which places the hinge device in the unlocked position;

rotating the display unit to a new desired angle relative to the main body; and sliding the display unit horizontally relative to the main body to realign the back edge of the display unit with the main body, which places the hinge device in the locked position to maintain the display at the new angle.

18. An electrical or electronic apparatus, comprising:

a main body;

a display unit that is closed relative to the main body; and a hinge device that rotatably joins the display unit to the main body, wherein the display unit is opened by sliding the display unit horizontally relative to the main body to offset a back edge of the display unit from the main body, which places the hinge device in an unlocked position, opening the display unit by rotating the display unit away from the main body to a desired angle relative to the main body, and sliding the display unit horizontally relative to the main body to realign the back edge of the display unit with the main body, which places the hinge device in a locked position to maintain the display unit at the desired angle.

19. An electrical or electronic apparatus, comprising:

a main body;

a display unit that is closed relative to the main body; and a hinge device that rotatably joins the display unit to the main body, the hinge device comprising a locking mechanism integrally formed with the hinge device to lock the display unit to the main body without using a latch on the display unit, wherein the display unit is opened by sliding the display unit horizontally relative to the main body to offset a back edge of the display unit from the main body, which places the hinge device in an unlocked position, opening the display unit by rotating the display unit away from the main body to a desired angle relative to the main body, and sliding the display unit horizontally relative to the main body to realign the back edge of the display unit with the main body, which places the hinge device in a locked position to maintain the display unit at the desired angle.

* * * * *

UNITED STATES PATENT AND TRADEMARK OFFICE
CERTIFICATE OF CORRECTION

PATENT NO.         : 6,977,810 B2
APPLICATION NO. : 10/725628
DATED              : December 20, 2005
INVENTOR(S)        : Young-shin Song It is certified that error appears in the above-identified patent and that said Letters Patent is hereby corrected as shown below:

On Title page item 56
First Page Column 2 (Foreign Patent Document), Line 7, change "10-296036" to --10-296038--.

Signed and Sealed this

Twelfth Day of December, 2006

JON W. DUDAS
*Director of the United States Patent and Trademark Office*